United States Patent
Park et al.

(10) Patent No.: US 11,367,137 B2
(45) Date of Patent: Jun. 21, 2022

(54) PAYMENT PROCESSING APPARATUS USING VIRTUAL CURRENCY WITH AUTOMATIC TRADING FUNCTION OF VIRTUAL CURRENCY AND OPERATING METHOD THEREOF

(71) Applicant: UBIFUN CO., LTD., Seoul (KR)

(72) Inventors: Jin Hwan Park, Seoul (KR); Ji Sung Kim, Seoul (KR)

(73) Assignee: UBIFUN CO., LTD., Seoul (KR)

( * ) Notice: Subject to any disclaimer, the term of this patent is extended or adjusted under 35 U.S.C. 154(b) by 0 days.

(21) Appl. No.: 16/977,813

(22) PCT Filed: Mar. 5, 2020

(86) PCT No.: PCT/KR2020/003134
§ 371 (c)(1),
(2) Date: Sep. 3, 2020

(87) PCT Pub. No.: WO2020/184902
PCT Pub. Date: Sep. 17, 2020

(65) Prior Publication Data
US 2021/0374852 A1  Dec. 2, 2021

(30) Foreign Application Priority Data

Mar. 13, 2019 (KR) ........................ 10-2019-0028537

(51) Int. Cl.
| G06Q 40/00 | (2012.01) |
| G06Q 40/04 | (2012.01) |
| G06Q 20/06 | (2012.01) |
| G06Q 20/36 | (2012.01) |
| G06Q 20/38 | (2012.01) |
| G06Q 20/40 | (2012.01) |

(52) U.S. Cl.
CPC ............ *G06Q 40/04* (2013.01); *G06Q 20/065* (2013.01); *G06Q 20/3678* (2013.01); *G06Q 20/381* (2013.01); *G06Q 20/401* (2013.01)

(58) Field of Classification Search
None
See application file for complete search history.

(56) References Cited

U.S. PATENT DOCUMENTS

| 2007/0150413 A1* | 6/2007 | Morgenstern | ........ G06Q 20/10 705/39 |
| 2011/0307765 A1 | 12/2011 | Kim et al. | |
| 2019/0236593 A1* | 8/2019 | Vorobyev | ............ G06Q 20/223 |

FOREIGN PATENT DOCUMENTS

| KR | 10-1751497 B1 | 6/2017 | |
| KR | 10-1894566 B1 | 9/2018 | |
| KR | 10-2018-0107037 A | 10/2018 | |
| KR | 10-1952420 B1 | 2/2019 | |
| WO | WO-2013079306 A1 * | 6/2013 | ........ H03M 13/1148 |

* cited by examiner

*Primary Examiner* — Olabode Akintola
(74) *Attorney, Agent, or Firm* — Park, Kim & Suh, LLC

(57) ABSTRACT

Disclosed are a payment processing apparatus using a virtual currency with an automatic trading function of the virtual currency and an operating method thereof. The present invention may provide a platform which may use a virtual currency as a trading means of goods by presenting a payment processing apparatus for supporting a product purchaser to pay a price of a product to a product seller using a virtual currency and an operating method thereof.

9 Claims, 2 Drawing Sheets

PAYMENT PROCESSING APPARATUS USING VIRTUAL CURRENCY WITH AUTOMATIC TRADING FUNCTION OF VIRTUAL CURRENCY AND OPERATING METHOD THEREOF

CROSS-REFERENCE TO RELATED APPLICATIONS

This application is the National Stage filing under 35 U.S.C. 371 of International Application No. PCT/KR2020/003134, filed on Mar. 5, 2020, which claims the benefit of Korean Patent Application No. 10-2019-0028537, filed on Mar. 13, 2019, the contents of which are all hereby incorporated by reference herein in their entirety.

TECHNICAL FIELD

The present invention relates to a payment processing apparatus for supporting payment processing for a product price using a virtual currency and an operating method thereof.

BACKGROUND ART

In recent years, an interest in a virtual currency which may be used in cyber space other than traditional cash has increased.

The virtual currency which is a currency that replaces cash to be used for trading goods has been spread in the form of points or electronic gift certificates that may be used in specific shopping malls.

In recent years, a blockchain-based cryptocurrency which supports countermeasures against manipulation or hacking of a trading ledger has emerged as a representative of the virtual currency by distributing the trading ledger to multiple peers rather than being managed by a central system.

The virtual currency is traded in the form of transferring from an electronic wallet of a specific user to the electronic wallet of another user through a virtual currency exchange, etc., and when trading of the virtual currency occurs, a specific peer among peers existing in a blockchain network generates a block recording trading information and distributes the generated block to multiple peers, thereby enabling multiplexing of the trading ledger.

As such, although the virtual currency is widely spread, a platform supporting the use of the virtual currency as a means of trading for goods has not been properly established, so a function of the virtual currency as a currency is not fully realized.

Accordingly, there is a need for research on a payment processing service that supports users to freely purchase products using the virtual currency.

DISCLOSURE

Technical Problem

The present invention has been made in an effort to provide a platform which may use a virtual currency as a trading means of goods by presenting a payment processing apparatus for supporting a product purchaser to pay for a product to a product seller using a virtual currency and an operating method thereof.

Technical Solution

An embodiment of the present invention provides a payment processing apparatus using a virtual currency, which includes: an electronic wallet database in which member information of a plurality of members and information on a holding amount of a virtual currency held by each of the plurality of members are stored to correspond to each other; an information receiving unit receiving, when an account transfer agency request signal for payment of a first product which a first member purchases from a product seller is received from a first user terminal of the first member among the plurality of members, account information for the product seller and information on the amount of the first product from the first user terminal; and a payment agency processing unit performing transfer processing for an amount corresponding to the amount of the first product to the account of the product seller based on the account information for the product seller and calculating a virtual currency amount corresponding to the amount of the first product according to a predetermined virtual currency exchange rate and subtracting the calculated virtual currency amount from the holding amount of the virtual currency for the first member, which is stored in the electronic wallet database.

Further, another embodiment of the present invention provides an operating method of a payment processing apparatus using a virtual currency, which includes: maintaining an electronic wallet database in which member information of a plurality of members and information on a holding amount of a virtual currency held by each of the plurality of members are stored to correspond to each other; receiving, when an account transfer agency request signal for payment of a first product which a first member purchases from a product seller is received from a first user terminal of the first member among the plurality of members, account information for the product seller and information on the amount of the first product from the first user terminal; and performing transfer processing for an amount corresponding to the amount of the first product to the account of the product seller based on the account information for the product seller and calculating a virtual currency amount corresponding to the amount of the first product according to a predetermined virtual currency exchange rate and subtracting the calculated virtual currency amount from the holding amount of the virtual currency for the first member, which is stored in the electronic wallet database.

Advantageous Effects

According to embodiments of the present invention, it is possible to provide a platform which may use a virtual currency as a trading means of goods by presenting a payment processing apparatus for supporting a product purchaser to pay a price of a product to a product seller using a virtual currency and an operating method thereof.

MODE FOR INVENTION

Hereinafter, embodiments of the present invention will be described in detail with reference to the accompanying drawings. The description does not limit the present invention to specific embodiments, and it should be understood that the present invention covers all the modifications, equivalents and replacements included within the idea and technical scope of the present invention. In describing each drawing, like reference numerals refer to like elements and if not contrarily defined, all terms used herein including technological or scientific terms have the same meanings as those generally understood by a person with ordinary skill in the art.

In this document, unless explicitly described to the contrary, the word "comprise" and variations such as "comprises" or "comprising" will be understood to imply the inclusion of stated elements but not the exclusion of any other elements. Further, in various embodiments of the present invention, each of components, functional blocks or means may be constituted by one or more lower components and electrical, electronic, and mechanical functions performed by respective components may be implemented as various known devices or mechanical elements including an electronic circuit, an integrated circuit, an Application Specific Integrated Circuit (ASIC), etc., and the respective components may be separately implemented or two or more components may be integrated into one and implemented.

Meanwhile, blocks of the accompanying block diagram or steps of a flowchart may be appreciated as meaning compute program instructions mounted on a processor or a memory of data processible equipment such as a universal computer, a special computer, a portable notebook computer, a network computer, etc., and performing designated functions. Since the computer program instructions may be stored in a memory provided in a computer device or a computer readable memory, functions described in blocks of a block diagram or steps of a flowchart may be produced as a manufactured object including an instruction mean performing the functions. Moreover, each block or each step may represent a part of a module, a segment, or a code that includes one or more executable instructions for executing a specified logical function(s). It should also be noted that in some replaceable embodiments, the functions mentioned in the blocks or steps may also be executed differently from a predetermined order. For example, two blocks or steps that are subsequently illustrated are substantially simultaneously carried out, or may be performed in a reverse order, and in some cases, the functions may be performed while some blocks or steps are omitted.

Figure 1:
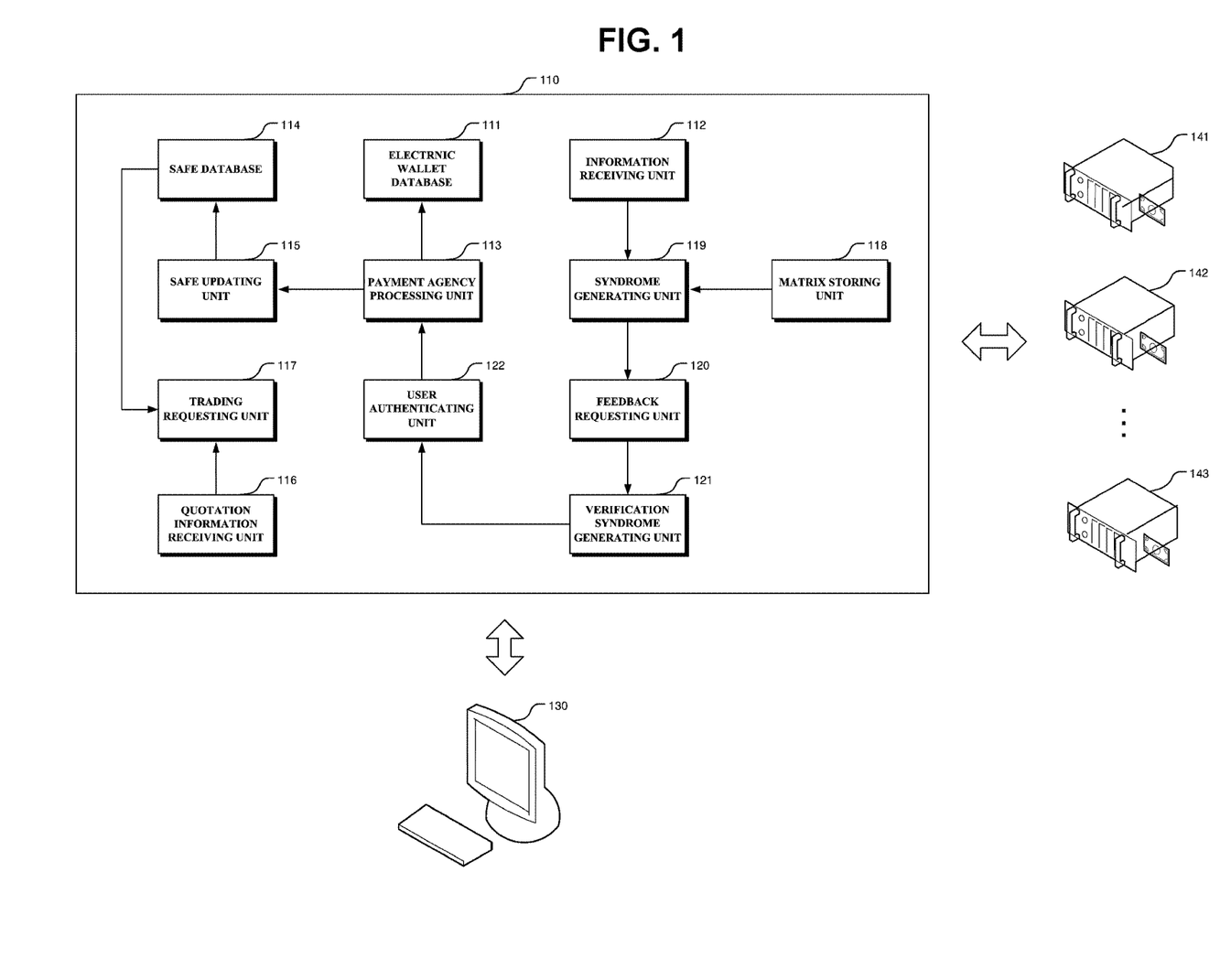
FIG. 1 is a diagram illustrating a structure of a payment processing apparatus using a virtual currency according to an embodiment of the present invention.

FIG. 1 is a diagram illustrating a structure of a payment processing apparatus using a virtual currency according to an embodiment of the present invention.

Referring to FIG. 1, the payment processing apparatus 110 according to the present invention includes an electronic wallet database 111, an information receiving unit 112, and a payment agency processing unit 113.

Member information of a plurality of members and information on a holding amount of a virtual currency held by each of the plurality of members are stored in the electronic wallet database 111 to correspond to each other.

When the information receiving unit 112 receives, from a first user terminal 130 of a first member among the plurality of members, an account transfer agency request signal for payment of a first product which the first member purchases from a product seller, the information receiving unit 112 receives account information for the product seller and information on the amount of the first product from the first user terminal 130.

In this regard, when the first member obtains the account information for the payment of the first product from the product seller as the first member purchases the first product from the product seller through a predetermined online or offline shopping mall, the first member may transmit the account transfer agency request signal to the payment processing apparatus 110 using the first user terminal 130 and transmit the account information for the product seller and the information on the amount of the first product.

When the first member accesses the predetermined online shopping mall using the first user terminal 130 and then purchases the first product from the product seller, a server of the online shopping mall may provide a webpage including the account information of the product seller and the information on the amount of the first product to the first user terminal 130. In this case, the webpage including the account information of the product seller and the information on the amount of the first product may be displayed on a screen of the first user terminal 130 and when the first user terminal 130 transmits the account transfer agency request signal to the payment processing apparatus 110, the information receiving unit 112 crawls the webpage displayed on the screen of the first user terminal 130 and then performs text mining to obtain the account information of the product seller and the information on the amount of the first product from the webpage.

The payment agency processing unit 113 performs transfer processing for an amount corresponding to the amount of the first product to the account of the product seller based on the account information for the product seller and calculates a virtual currency amount corresponding to the amount of the first product according to a predetermined virtual currency exchange rate and subtracts the calculated virtual currency amount from the holding amount of the virtual currency for the first member, which is stored in the electronic wallet database 111.

For example, when the amount of the first product is '20,000 won', the holding amount of the virtual currency of the first member stored in the electronic wallet database 111 is '100,000 coins', and the predetermined virtual currency exchange rate is 'cash:virtual currency=2:1', the payment agency processing unit 113 may complete account transfer processing of the amount of the first product such as '20,000 won' to the account of the product seller and then subtract '10,000 coins' from '100,000 coins' which is the holding amount of the virtual currency of the first member stored in the electronic wallet database 111.

In this case, according to an embodiment of the present invention, the payment processing apparatus 110 may further include a safe database 114 and a safe updating unit 115.

Information on a total amount of the virtual currency held by an operator of the payment processing apparatus 110 is stored in the safe database 114.

When the subtraction of the calculated virtual currency amount from the holding amount of the virtual currency for the first member stored in the electronic wallet database 111 is completed as the transfer processing for the amount of the first product is performed, the safe updating unit 115 adds the calculated virtual currency amount to a total holding amount of the virtual currency stored in the safe database 114.

In this regard, as in the aforementioned example, when the account transfer processing of the amount of the first product such as '20,000 won' to the account of the product seller is completed by the payment agency processing unit 113 and the subtraction of '10,000 coins' from '100,000 coins' which is the holding amount of the virtual currency of the first member stored in the electronic wallet database 111 is completed, the safe updating unit 115 may add '10,000 coins' to the total holding amount of the virtual currency of the operator stored in the safe database 114.

That is, when an account transfer agency request for payment of the product is received from the first user terminal 130 of the first member, the payment processing apparatus 110 using the virtual currency according to the present invention processes an account transfer in cash to the product seller and subtracts the virtual currency amount corresponding to the amount of the product from the virtual currency holding amount of the first member and then adds the amount to the virtual currency holding amount of the operator of the payment processing apparatus 110 to support the product seller to receive the amount of the product in cash and the first member to purchase the product with the virtual currency, and the operator of the payment processing apparatus 110 may receive a reward corresponding to the amount of the first product in virtual currency from the first member.

In this case, according to an embodiment of the present invention, the payment processing apparatus 110 may further include a quotation information receiving unit 116 and a trading requesting unit 117.

The quotation information receiving unit 116 accesses servers 141, 142, and 143 of a plurality of virtual currency exchanges at a predetermined periodic interval to receive trading quotation information for the virtual currency in each exchange from each of the servers 141, 142, and 143 of the plurality of virtual currency exchanges.

When the trading requesting unit 117 confirms that a trading quotation in a first virtual currency exchange among the plurality of virtual currency exchanges exceeds a predetermined reference quotation, the trading requesting unit 117 transmits a selling request signal for the total holding amount of the virtual currency stored in the safe database 114 to the server of the first virtual currency exchange.

For example, when the predetermined reference quotation is '1 coin=3 won' and it is confirmed that the trading quotation in 'virtual currency exchange 1' among the plurality of virtual currency exchanges is '1 coin=3.5 won' at a specific period, the trading requesting unit 117 may transmit the selling request signal for the total holding amount of the virtual currency held by the operator of the payment processing apparatus 110 stored in the safe database 114 to the server of 'virtual currency exchange 1'.

Consequently, when each member purchases the product, the payment processing apparatus 110 according to the present invention may perform the transfer processing of the amount of the product to the seller and when the trading quotation of the corresponding virtual currency exceeds a predetermined reference value after receiving the virtual currency corresponding to the amount from the member, the payment processing apparatus 110 performs the selling of the virtual currency to achieve profit generation of the operator of the payment processing apparatus 110.

According to an embodiment of the present invention, the payment processing apparatus 110 may further include an authentication configuration for authenticating whether the first user terminal 110 is a user terminal of a member who normally subscribes in a payment processing service, in the process of performing the payment processing according to the present invention as the account transfer agency request signal is received from the first user terminal 110.

In this regard, according to an embodiment of the present invention, the payment processing apparatus 110 may further include a matrix storing unit 118, a syndrome generating unit 119, a feedback requesting unit 120, a verification syndrome generating unit 121, and a user authenticating unit 122.

The matrix storing unit 118 stores a parity check matrix corresponding to a predetermined generation matrix having an error correction capability for a code of t (t is a natural number of 1 or more) bits used for user authentication.

The parity check matrix is a matrix for verifying whether an error occurs in data received by a data receiving side when a data transmitting side transmits a codeword encoded based on a predetermined generation matrix to the data receiving side. When there is a generation matrix G having a size of k×n (k and n are natural numbers and n is a number larger than k) and the parity check matrix corresponding to the generation matrix G is 'H', the size of the parity check matrix H is (n−k)×n and there is a characteristic as shown in Equation 1 below in a relationship with the generation matrix G.

$$GH^T=0 \qquad \text{[Equation 1]}$$

Here, $H^T$ means a transposed matrix of the parity check matrix.

When as the data transmitting side generates a codeword c by using the generation matrix G and transmits the generated codeword c to the data receiving side, the data received by the data receiving side is 'r' and the error does not occur in the data r, there is a characteristic shown in Equation 2 below in the relationship with the parity check matrix H with respect to the data r.

$$rH^T=cH^T=0 \qquad \text{[Equation 2]}$$

However, when an error e occurs in the codeword c transmitted by the data transmitting side, the data r received by the data receiving side will become 'c⊕e', and as a result, there is a characteristic shown in Equation 3 below between the parity check matrix H and the data r.

$$rH^T=(c\oplus e)H^T=cH^T\oplus eH^T=eH^T=S \qquad \text{[Equation 3]}$$

Here, ⊕ means an exclusive OR operation.

Like the operation in Equation 3 above, the data receiving side may detect whether the error is present in the data received by the data receiving side by using the parity check matrix. In this case, 'S' refers to syndrome in Equation 3 above and the data receiving side computes the syndrome based on the parity check matrix H and then performs syndrome decoding for finding e satisfying $eH^T=S$ to find the error e included in the received data r.

In the syndrome decoding, when the error correction capability of the parity check matrix is t, the error code e satisfying $eH^T=S$ may be found only when a data error occurs with respect to bits of t or less.

When the account information for the product seller and the information for the amount of the first product from the first user terminal 130 are received through the information receiving unit 112, the syndrome generating unit 119 randomly generates an error code of which a Hamming weight is t and generates the syndrome for the error code based on the error code and the parity check matrix.

Here, the Hamming weight means the number of code values, which is '1' in a set of code values constituted by '0' and '1'.

In addition, the syndrome generating unit 119 may generate the syndrome for the error code based on Equation 4 below.

$$eH^T=S \qquad \text{[Equation 4]}$$

Here, e represents the error code of which the Hamming weight is t and S represents the syndrome.

The feedback requesting unit 120 transmits the error code to the first user terminal 130 and transmits a feedback request for the codeword in which the error code is inserted as the error to the first user terminal 130.

In this case, according to an embodiment of the present invention, the first user terminal 130 stores the predetermined generation matrix in a memory, and when the error code and the feedback request are received from the payment processing apparatus 110, the first user terminal 130 may confirm whether the Hamming weight of the error code is t, and when it is confirmed that the Hamming weight of the error code is t, the first user terminal 130 may randomly generate a random code, generate the first codeword by encoding the random code based on the predetermined generation matrix stored in the memory, generate the feedback code by inserting the error code into the first codeword as the error, and then transmit the feedback code to the payment processing apparatus 110.

In this regard, when the error code received from the payment processing apparatus 110 is referred to as 'e', the first user terminal 130 may first confirm whether the Hamming weight of the error code e is t.

When it is confirmed that the Hamming weight of the error code e is t, the first user terminal 130 may confirm that the error code e is a code normally generated and transmitted from the payment processing apparatus 110 and randomly generate a predetermined random code and then generate a first codeword by encoding the random code based on the predetermined generation matrix stored in the memory.

In this regard, when the predetermined generation matrix is the generation matrix G having the size of k×n, the first user terminal 130 may randomly generate the random code having the size of k bits and then generate the first codeword according to the operation of Equation 5 below by using the generation matrix G.

$$c=rG \qquad \text{[Equation 5]}$$

Here, c represents the first codeword and r represents the random code.

As such, when the first codeword c is generated, the first user terminal 130 may generate the feedback code by inserting the error code e into the first codeword c as the error according to the operation of Equation 6 below.

$$p=c\oplus e \qquad \text{[Equation 6]}$$

Here, p represents the feedback code.

As such, when the feedback code p is generated, the first user terminal 130 may transmit the feedback code to the payment processing apparatus 110.

In this case, when the feedback code which is generated by inserting the error code, as the error, into the first codeword (the first codeword is a codeword generated by encoding the random code generated in the first user terminal 130 based on the predetermined generation matrix prestored in the first user terminal 130) generated in the first user terminal 130 is received from the first user terminal 130, the verification syndrome generating unit 121 generates a verification syndrome from the feedback code based on the parity check matrix.

In this regard, when the feedback code is p generated according to the operation of Equation 6 above, the verification syndrome generating unit 121 may generate the verification syndrome based on the operation of Equation 7 below.

$$S_c=pH^T \qquad \text{[Equation 7]}$$

Here, $S_c$ represents the verification syndrome.

When the syndrome for the error code and the verification syndrome are compared with each other and it is confirmed that both syndromes coincide with each other, the user authenticating unit 122 completes authentication for the first user terminal 130.

In this regard, when it is confirmed that the syndrome S for the error code computed according to Equation 4 above and the verification syndrome $S_c$ computed according to Equation 7 above coincide with each other, the user authenticating unit 122 may complete authentication for the first user terminal 130.

A case where the syndrome S for the error code computed according to Equation 4 above and the verification syndrome $S_c$ computed according to Equation 7 above coincide with each other may mean that the first user terminal 130 fed back, to the payment processing apparatus 110, the feedback code generated by inserting, as the error, the error code having the Hamming weight of t issued by the payment processing apparatus 110 for the codeword generated through the generation matrix having an error correction capability of t or less corresponding to the parity check matrix stored in the payment processing apparatus 110.

This may be proved by operation of Equation 8 below.

$$\begin{aligned} S_c &= pH^T = (c\oplus e)H^T = cH^T \oplus eH^T \\ &= eH^T (\text{since } cH^T = 0) \\ &= S \end{aligned} \qquad \text{[Equation 8]}$$

When the first user terminal 130 generates the codeword through the generation matrix having the error correction capability of t or less corresponding to the parity check matrix stored in the payment processing apparatus 110 and then generates the feedback code by inserting, as the error, the error code having the Hamming weight of t issued by the payment processing apparatus 110 for the generated codeword, the verification syndrome $S_c$ will be computed as $eH^T$ according to the operation of Equation 8 above and $eH^T$ will be equal to the syndrome S for the error code shown in Equation 4 above.

As a result, when it is confirmed that the syndrome S for the error code computed according to Equation 4 above and the verification syndrome $S_c$ computed according to Equation 7 above coincide with each other, the user authenticating unit 122 may authenticate that the first user terminal 130 is a normal user terminal registered as the member.

As such, when authentication for the first user terminal 130 is completed, the payment agency processing unit 113 may perform transfer processing for an amount corresponding to the amount of the first product to the account of the product seller based on the account information for the product seller and calculate a virtual currency amount corresponding to the amount of the first product according to a predetermined virtual currency exchange rate and subtract the calculated virtual currency amount from the holding amount of the virtual currency for the first member, which is stored in the electronic wallet database 111.

Figure 2:
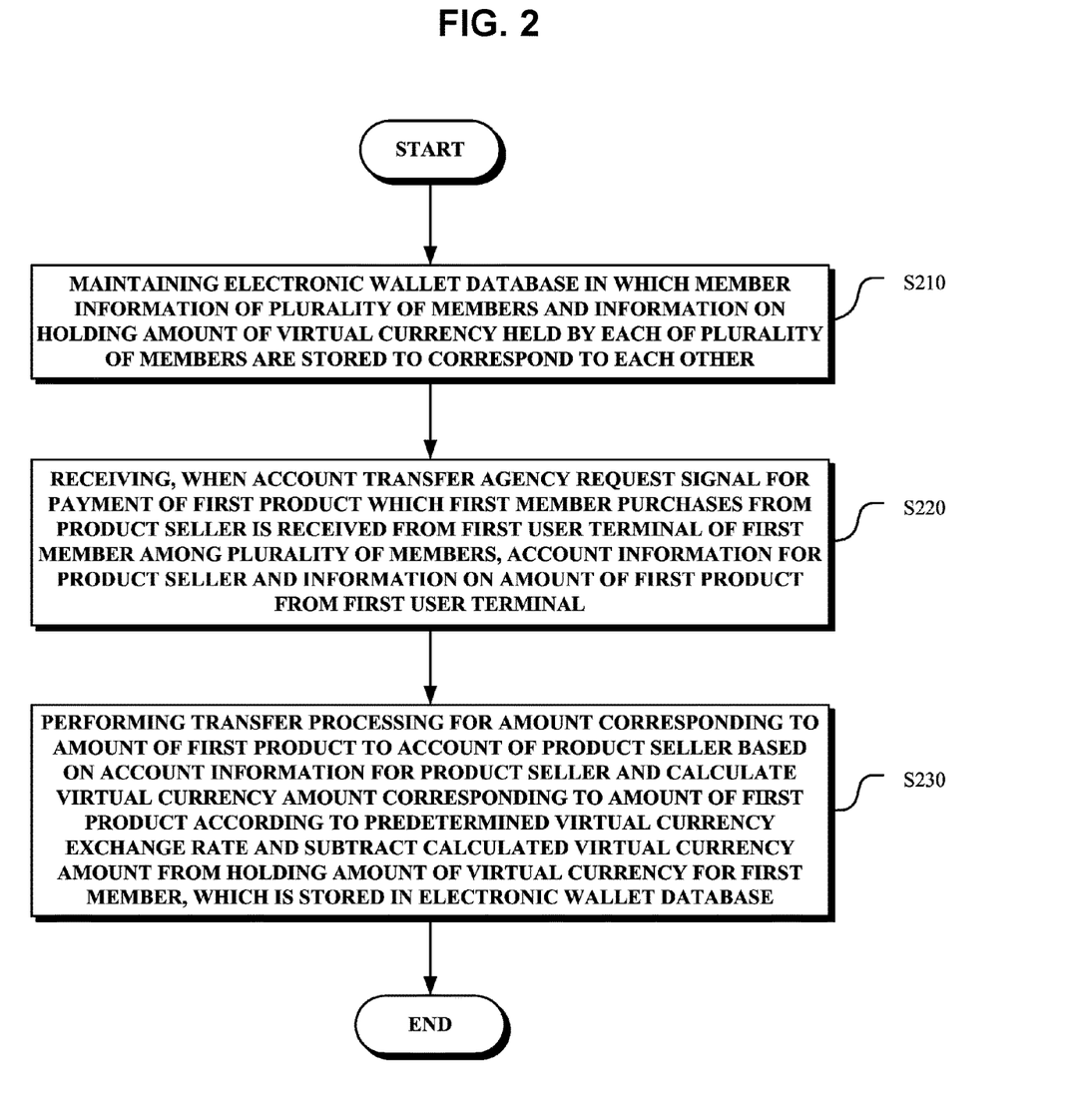
FIG. 2 is a flowchart illustrating an operating method of a payment processing apparatus using a virtual currency according to an embodiment of the present invention.

FIG. 2 is a flowchart illustrating an operating method of a payment processing apparatus using a virtual currency according to an embodiment of the present invention.

In step S210, an electronic wallet database is maintained, in which member information of a plurality of members and information on a holding amount of a virtual currency held by each of the plurality of members are stored to correspond to each other.

In step S220, when an account transfer agency request signal for payment of a first product which the first member purchases from a product seller is received from a first user terminal 130 of a first member among the plurality of members, account information for the product seller and information on the amount of the first product is received from the first user terminal 130.

In step S230, transfer processing for an amount corresponding to the amount of the first product to the account of the product seller is performed based on the account information for the product seller and a virtual currency amount corresponding to the amount of the first product is calculated according to a predetermined virtual currency exchange rate and the calculated virtual currency amount is subtracted from the holding amount of the virtual currency for the first member, which is stored in the electronic wallet database.

In this case, according to an embodiment of the present invention, the operating method of a payment processing apparatus using a virtual currency may further include: maintaining a safe database storing information on a total amount of the virtual currency held by an operator of the payment processing apparatus; and adding, when the subtraction of the calculated virtual currency amount from the holding amount of the virtual currency for the first member stored in the electronic wallet database is completed as the transfer processing for the amount of the first product is performed, the calculated virtual currency amount to a total holding amount of the virtual currency stored in the safe database.

In this case, according to an embodiment of the present invention, the operating method of a payment processing apparatus using a virtual currency may further include: accessing servers of a plurality of virtual currency exchanges at a predetermined periodic interval to receive trading quotation information for the virtual currency in each exchange from each of the servers of the plurality of virtual currency exchanges; and transmitting, when it is confirmed that a trading quotation in a first virtual currency exchange among the plurality of virtual currency exchanges exceeds a predetermined reference quotation, a selling request signal for the total holding amount of the virtual currency stored in the safe database to the server of the first virtual currency exchange.

Further, according to an embodiment of the present invention, the operating method of a payment processing apparatus using a virtual currency may further include: maintaining a matrix storing unit storing a parity check matrix corresponding to a predetermined generation matrix having an error correction capability for a code of t (t is a natural number of 1 or more) bits used for user authentication; randomly generating, when receiving the account information for the product seller and the information for the amount of the first product from the first user terminal, an error code of which a Hamming weight is t and generating the syndrome for the error code based on the error code and the parity check matrix; transmitting the error code to the first user terminal and transmitting a feedback request for the codeword in which the error code is inserted as the error to the first user terminal; generating, when the feedback code which is generated by inserting the error code, as the error, into the first codeword (the first codeword is a codeword generated by encoding the random code generated in the first user terminal based on the predetermined generation matrix prestored in the first user terminal) generated in the first user terminal is received from the first user terminal, a verification syndrome from the feedback code based on the parity check matrix; and completing, when the syndrome for the error code and the verification syndrome are compared with each other and it is confirmed that both syndromes coincide with each other, authentication for the first user terminal.

In this case, in step S230, when authentication for the first user terminal is completed, transfer processing for an amount corresponding to the amount of the first product to the account of the product seller may be performed based on the account information for the product seller and a virtual currency amount corresponding to the amount of the first product may be calculated according to a predetermined virtual currency exchange rate and the calculated virtual currency amount may be subtracted from the holding amount of the virtual currency for the first member, which is stored in the electronic wallet database.

In this case, according to an embodiment of the present invention, the first user terminal stores the predetermined generation matrix in a memory, and when the error code and the feedback request are received from the payment processing apparatus, it may be confirmed whether the Hamming weight of the error code is t, and when it is confirmed that the Hamming weight of the error code is t, the first user terminal 130 may randomly generate a random code, generate the first codeword by encoding the random code based on the predetermined generation matrix stored in the memory, generate the feedback code by inserting the error code into the first codeword as the error, and then transmit the feedback code to the payment processing apparatus.

Hereinabove, referring to FIG. 2, the operating method of the payment processing apparatus using the virtual currency according to an embodiment of the present invention is described. Here, since the operating method of the payment processing apparatus using the virtual currency according to an embodiment of the present invention may correspond to the configuration of the operation of the payment processing apparatus 110 using the virtual currency described by using FIG. 1, a more detailed description thereof will be omitted.

The operating method of the payment processing apparatus using the virtual currency according to an embodiment of the present invention may be implemented by a computer program stored in a storage medium for executing the computer program through coupling with a computer.

Further, the operating method of the payment processing apparatus using the virtual currency according to an embodiment of the present invention may be implemented in a program command type which may be performed through various computer means and recorded in a computer readable medium. The computer readable medium may singly or combinationally include a program command, a data file, or a data structure or a combination thereof. The program command recorded in the medium may be program instructions specially designed and configured for the present invention, or may be program instructions publicly known to and used by those skilled in the computer software field. Examples of the computer-readable recording medium include magnetic media such as a hard disk, a floppy disk, and a magnetic tape, optical media such as a CD-ROM and a DVD, magneto-optical media such as a floptical disk, and a hardware device which is specifically configured to store and execute the program command such as a ROM, a RAM, and a flash memory. Examples of the program command include a high-level language code executable by a computer by using an interpreter, and the like, as well as a machine language code created by a compiler.

As described above, the present invention has been described by specified matters such as detailed components, and the like and limited embodiments and drawings, but the description is just provided to assist more overall understanding of the present invention and the present invention is not limited to the embodiment and various modifications and changes can be made by those skilled in the art from such a disclosure.

Accordingly, the spirit of the present invention should not be defined only by the described embodiments, and it should be appreciated that claims to be described below and all things which are equivalent to the claims or equivalently modified to the claims are included in the scope of the spirit of the present invention.

The invention claimed is:

1. A payment processing apparatus using a virtual currency, the payment processing apparatus comprising:
   an electronic wallet database in which member information of a plurality of members and information on a holding amount of a virtual currency held by each of the plurality of members are stored to correspond to each other;
   an information receiving unit receiving, when an account transfer agency request signal for payment of a first product which a first member purchases from a product seller is received from a first user terminal of the first member among the plurality of members, account information for the product seller and information on the amount of the first product from the first user terminal;
   a payment agency processing unit performing transfer processing for an amount corresponding to the amount of the first product to the account of the product seller based on the account information for the product seller and calculating a virtual currency amount corresponding to the amount of the first product according to a predetermined virtual currency exchange rate and subtracting the calculated virtual currency amount from the holding amount of the virtual currency for the first member, which is stored in the electronic wallet database;
   a matrix storing unit storing a parity check matrix corresponding to a predetermined generation matrix having an error correction capability for a code of t bits used for user authentication, wherein t is a natural number;
   a syndrome generating unit randomly generating, when the account information for the product seller and the information for the amount of the first product are received from the first user terminal through the information receiving unit, an error code of which a Hamming weight is t and generating a syndrome for the error code based on the error code and the parity check matrix;
   a feedback requesting unit transmitting the error code to the first user terminal and transmitting a feedback request of the codeword in which the error code is inserted as the error to the first user terminal;
   a verification syndrome generating unit generating, when a feedback code which is generated by inserting the error code, as the error, into a first codeword generated in the first user terminal is received from the first user terminal, a verification syndrome from the feedback code based on the parity check matrix, wherein the first codeword is a codeword generated by encoding the random code generated in the first user terminal based on the predetermined generation matrix prestored in the first user terminal; and
   a user authenticating unit completing, when the syndrome for the error code and the verification syndrome are compared with each other and it is confirmed that both syndromes coincide with each other, authentication for the first user terminal,
   wherein when authentication for the first user terminal is completed, the payment agency processing unit performs transfer processing for an amount corresponding to the amount of the first product to the account of the product seller based on the account information for the product seller and calculates a virtual currency amount corresponding to the amount of the first product according to a predetermined virtual currency exchange rate and subtracts the calculated virtual currency amount from the holding amount of the virtual currency for the first member, which is stored in the electronic wallet database.

2. The payment processing apparatus of claim 1, further comprising:
   a safe database storing information on a total amount of the virtual currency held by an operator of the payment processing apparatus; and
   a safe updating unit adding, when the subtraction of the calculated virtual currency amount from the holding amount of the virtual currency for the first member stored in the electronic wallet database is completed as the transfer processing for the amount of the first product is performed, the calculated virtual currency amount to a total holding amount of the virtual currency stored in the safe database.

3. The payment processing apparatus of claim 2, further comprising:
   a quotation information receiving unit accessing servers of a plurality of virtual currency exchanges at a predetermined periodic interval to receive trading quotation information for the virtual currency in each exchange from each of the servers of the plurality of virtual currency exchanges; and
   a trading requesting unit transmitting, when it is confirmed that a trading quotation in a first virtual currency exchange among the plurality of virtual currency exchanges exceeds a predetermined reference quotation, a request signal for selling the total holding amount of the virtual currency stored in the safe database to the server of the first virtual currency exchange.

4. The payment processing apparatus of claim 1, wherein the first user terminal stores the predetermined generation matrix in a memory, and when the error code and the feedback request are received from the payment processing apparatus, the first user terminal confirms whether the Hamming weight of the error code is t, and when it is confirmed that the Hamming weight of the error code is t, the first user terminal randomly generates a random code, generates the first codeword by encoding the random code based on the predetermined generation matrix stored in the memory, generates the feedback code by inserting the error code into the first codeword as the error, and then transmits the feedback code to the payment processing apparatus.

5. An operating method of a payment processing apparatus using a virtual currency, the operating method comprising:

maintaining an electronic wallet database in which member information of a plurality of members and information on a holding amount of a virtual currency held by each of the plurality of members are stored to correspond to each other;

receiving, when an account transfer agency request signal for payment of a first product which a first member purchases from a product seller is received from a first user terminal of the first member among the plurality of members, account information for the product seller and information on the amount of the first product from the first user terminal;

performing transfer processing for an amount corresponding to the amount of the first product to the account of the product seller based on the account information for the product seller and calculating a virtual currency amount corresponding to the amount of the first product according to a predetermined virtual currency exchange rate and subtracting the calculated virtual currency amount from the holding amount of the virtual currency for the first member, which is stored in the electronic wallet database;

maintaining a matrix storing unit storing a parity check matrix corresponding to a predetermined generation matrix having an error correction capability for a code of t bits used for user authentication, wherein t is a natural number of 1 or more;

randomly generating, when the account information for the product seller and the information for the amount of the first product are received from the first user terminal through the receiving of the information, an error code of which a Hamming weight is t and generating a syndrome for the error code based on the error code and the parity check matrix;

transmitting the error code to the first user terminal and transmitting a feedback request of the codeword in which the error code is inserted as the error to the first user terminal;

generating, when a feedback code which is generated by inserting the error code, as the error, into a first codeword generated in the first user terminal is received from the first user terminal, a verification syndrome from the feedback code based on the parity check matrix, wherein the first codeword is a codeword generated by encoding the random code generated in the first user terminal based on the predetermined generation matrix prestored in the first user terminal; and completing, when the syndrome for the error code and the verification syndrome are compared with each other and it is confirmed that both syndromes coincide with each other, authentication for the first user terminal, wherein in the subtracting, when authentication for the first user terminal is completed, transfer processing for an amount corresponding to the amount of the first product to the account of the product seller is performed based on the account information for the product seller and a virtual currency amount corresponding to the amount of the first product is calculated according to a predetermined virtual currency exchange rate and the calculated virtual currency amount is subtracted from the holding amount of the virtual currency for the first member, which is stored in the electronic wallet database.

6. The operating method of claim 5, further comprising:
maintaining a safe database storing information on a total amount of the virtual currency held by an operator of the payment processing apparatus; and
adding, when the subtraction of the calculated virtual currency amount from the holding amount of the virtual currency for the first member stored in the electronic wallet database is completed as the transfer processing for the amount of the first product is performed, the calculated virtual currency amount to a total holding amount of the virtual currency stored in the safe database.

7. The operating method of claim 6, further comprising:
accessing servers of a plurality of virtual currency exchanges at a predetermined periodic interval to receive trading quotation information for the virtual currency in each exchange from each of the servers of the plurality of virtual currency exchanges; and
transmitting, when it is confirmed that a trading quotation in a first virtual currency exchange among the plurality of virtual currency exchanges exceeds a predetermined reference quotation, a request signal for selling the total holding amount of the virtual currency stored in the safe database to the server of the first virtual currency exchange.

8. The operating method of claim 5, wherein the first user terminal stores the predetermined generation matrix in a memory, and when the error code and the feedback request are received from the payment processing apparatus, the first user terminal confirms whether the Hamming weight of the error code is t, and when it is confirmed that the Hamming weight of the error code is t, the first user terminal randomly generates a random code, generates the first codeword by encoding the random code based on the predetermined generation matrix stored in the memory, generates the feedback code by inserting the error code into the first codeword as the error, and then transmits the feedback code to the payment processing apparatus.

9. A non-transitory computer readable recording medium having a program recorded therein for allowing a computer to execute an operating method of a payment processing apparatus using a virtual currency, the operating method comprising:
maintaining an electronic wallet database in which member information of a plurality of members and information on a holding amount of a virtual currency held by each of the plurality of members are stored to correspond to each other;
receiving, when an account transfer agency request signal for payment of a first product which a first member purchases from a product seller is received from a first user terminal of the first member among the plurality of members, account information for the product seller and information on the amount of the first product from the first user terminal;
performing transfer processing for an amount corresponding to the amount of the first product to the account of the product seller based on the account information for the product seller and calculating a virtual currency amount corresponding to the amount of the first product according to a predetermined virtual currency exchange rate and subtracting the calculated virtual currency amount from the holding amount of the virtual currency for the first member, which is stored in the electronic wallet database;
maintaining a matrix storing unit storing a parity check matrix corresponding to a predetermined generation matrix having an error correction capability for a code of t bits used for user authentication, wherein t is a natural number of 1 or more;

randomly generating, when the account information for the product seller and the information for the amount of the first product are received from the first user terminal through the receiving of the information, an error code of which a Hamming weight is t and generating a syndrome for the error code based on the error code and the parity check matrix;

transmitting the error code to the first user terminal and transmitting a feedback request of the codeword in which the error code is inserted as the error to the first user terminal;

generating, when a feedback code which is generated by inserting the error code, as the error, into a first codeword generated in the first user terminal is received from the first user terminal, a verification syndrome from the feedback code based on the parity check matrix, wherein the first codeword is a codeword generated by encoding the random code generated in the first user terminal based on the predetermined generation matrix prestored in the first user terminal; and completing, when the syndrome for the error code and the verification syndrome are compared with each other and it is confirmed that both syndromes coincide with each other, authentication for the first user terminal, wherein in the subtracting, when authentication for the first user terminal is completed, transfer processing for an amount corresponding to the amount of the first product to the account of the product seller is performed based on the account information for the product seller and a virtual currency amount corresponding to the amount of the first product is calculated according to a predetermined virtual currency exchange rate and the calculated virtual currency amount is subtracted from the holding amount of the virtual currency for the first member, which is stored in the electronic wallet database.

* * * * *